(12) United States Patent
Friedeman

(10) Patent No.: US 9,573,547 B2
(45) Date of Patent: Feb. 21, 2017

(54) FLEXIBLE IMPACT PROTECTION

(71) Applicant: Ag-Tech Industries Limited, Whangarei (NZ)

(72) Inventor: Christiaan F. Friedeman, Havelock North (NZ)

(73) Assignee: AG-TECH INDUSTRIES LIMITED, Dargaville (NZ)

( * ) Notice: Subject to any disclaimer, the term of this patent is extended or adjusted under 35 U.S.C. 154(b) by 0 days.

(21) Appl. No.: 14/381,673

(22) PCT Filed: Nov. 23, 2012

(86) PCT No.: PCT/NZ2012/000215
§ 371 (c)(1),
(2) Date: Aug. 28, 2014

(87) PCT Pub. No.: WO2013/129941
PCT Pub. Date: Sep. 6, 2013

(65) Prior Publication Data
US 2015/0069742 A1 Mar. 12, 2015

(30) Foreign Application Priority Data
Feb. 28, 2012 (NZ) .......................... 598475

(51) Int. Cl.
*B60R 21/13* (2006.01)
*B60R 21/02* (2006.01)
*B60R 21/11* (2006.01)

(52) U.S. Cl.
CPC .............. *B60R 21/13* (2013.01); *B60R 21/02* (2013.01); *B60R 21/11* (2013.01); *B60R 21/131* (2013.01);
(Continued)

(58) Field of Classification Search
CPC ......... B60R 21/02; B60R 21/11; B60R 21/13; B60R 21/131; B60R 2021/132; B60R 2021/134; B60R 2021/135
See application file for complete search history.

(56) References Cited

U.S. PATENT DOCUMENTS

| 1,247,674 A | 11/1917 | Hankinson |
| 3,901,550 A * | 8/1975 | Hamy ..................... B60R 21/02 280/753 |

(Continued)

FOREIGN PATENT DOCUMENTS

| AU | 2011201668 | 11/2011 |
| DE | 2216313 | 10/1973 |

(Continued)

*Primary Examiner* — Barry Gooden, Jr.
(74) *Attorney, Agent, or Firm* — Advent, LLP

(57) ABSTRACT

Disclosed is a flexible impact protection member for mounting to a first member to protect either or both the first member and a second member that impacts thereon. The protection member has a several mobile portions, each being mounted end on end to each other. There is at least one tensile connection between adjacent mobile portions to lock each of the mobile portions to each other to form the flexible impact protection member. At least one portion of the flexible impact protection member can be secured to the first member. The flexible impact protection member at least in part extends away from the first member when the first member is in a normal operation mode or orientation. The flexible impact protection member can deflect from its normal shape due to an impact event with the second member by the plurality of mobile portions moving relative to each other, such movement increasing tension in the tensile connection and therefore increasing stiffness of the flexible impact protection member.

20 Claims, 18 Drawing Sheets

(52) U.S. Cl.
CPC ... *B60R 2021/132* (2013.01); *Y10T 29/49622* (2015.01)

(56) References Cited

U.S. PATENT DOCUMENTS

| | | | |
|---|---|---|---|
| 4,350,367 A | | 9/1982 | Kolb et al. |
| 4,594,275 A | | 6/1986 | Stolz |
| 5,286,091 A | * | 2/1994 | Busch ................ B60R 21/02 297/464 |
| 5,375,908 A | * | 12/1994 | Goor ................ B60R 21/01 297/216.11 |
| 5,390,952 A | * | 2/1995 | Goor ................ B60R 21/01 280/730.1 |
| 5,476,309 A | * | 12/1995 | Chen ................ B60R 21/02 248/160 |
| 5,890,738 A | | 4/1999 | Heiner et al. |
| 6,145,921 A | | 11/2000 | Cho |
| 6,233,826 B1 | | 5/2001 | Wycech |
| 6,457,740 B1 | * | 10/2002 | Vaidyaraman ........ B60R 21/231 280/730.2 |
| 6,467,563 B1 | * | 10/2002 | Ryan ................ B60R 21/36 180/274 |
| 6,715,592 B2 | | 4/2004 | Suzuki et al. |
| 2002/0025746 A1 | * | 2/2002 | Murphy ................ B63B 1/248 441/66 |
| 2006/0138763 A1 | * | 6/2006 | Brady ................ B60R 21/231 280/756 |
| 2007/0000188 A1 | * | 1/2007 | Smushkovich ........... E04H 9/14 52/167.1 |
| 2007/0052226 A1 | * | 3/2007 | Tobaru ................ B60R 21/13 280/756 |
| 2008/0284206 A1 | | 11/2008 | Potocki |
| 2009/0267335 A1 | | 10/2009 | Johnson et al. |
| 2009/0278342 A1 | | 11/2009 | Browne et al. |
| 2013/0285357 A1 | * | 10/2013 | Eavenson, Sr. ........ A01D 75/20 280/756 |
| 2014/0300088 A1 | * | 10/2014 | Fukawatase ........... B60R 21/13 280/729 |

FOREIGN PATENT DOCUMENTS

| | | |
|---|---|---|
| EP | 952042 | 10/1999 |
| EP | 1580082 | 9/2005 |
| EP | 2073998 | 3/2011 |
| FR | 2145262 | 2/1973 |
| JP | 2006306377 | 11/2006 |
| JP | 2010100168 | 5/2010 |
| WO | 9725225 | 7/1997 |
| WO | 0018678 | 4/2000 |
| WO | 2008028226 | 3/2008 |

* cited by examiner

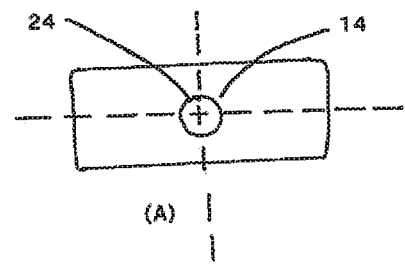
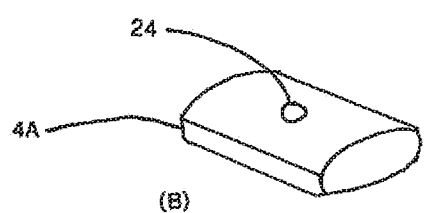
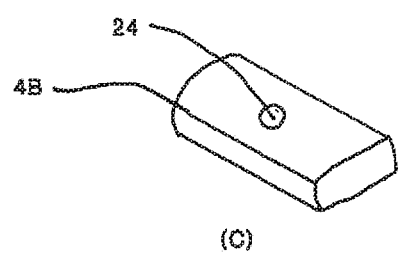
FIGURE 3

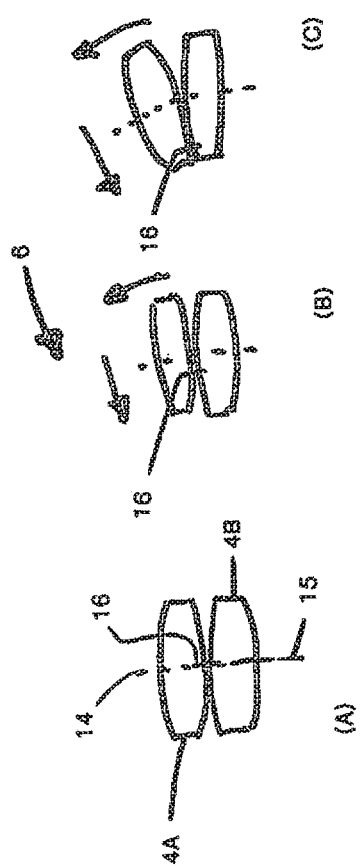

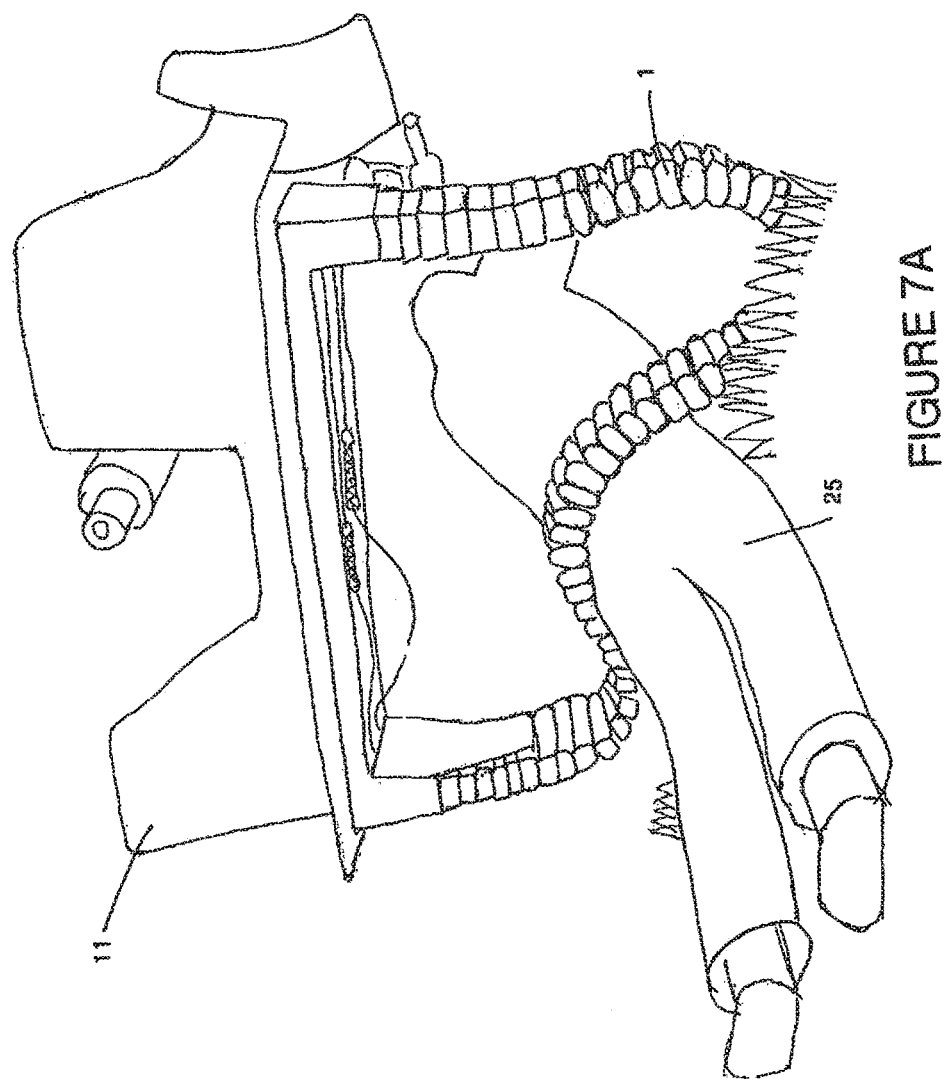

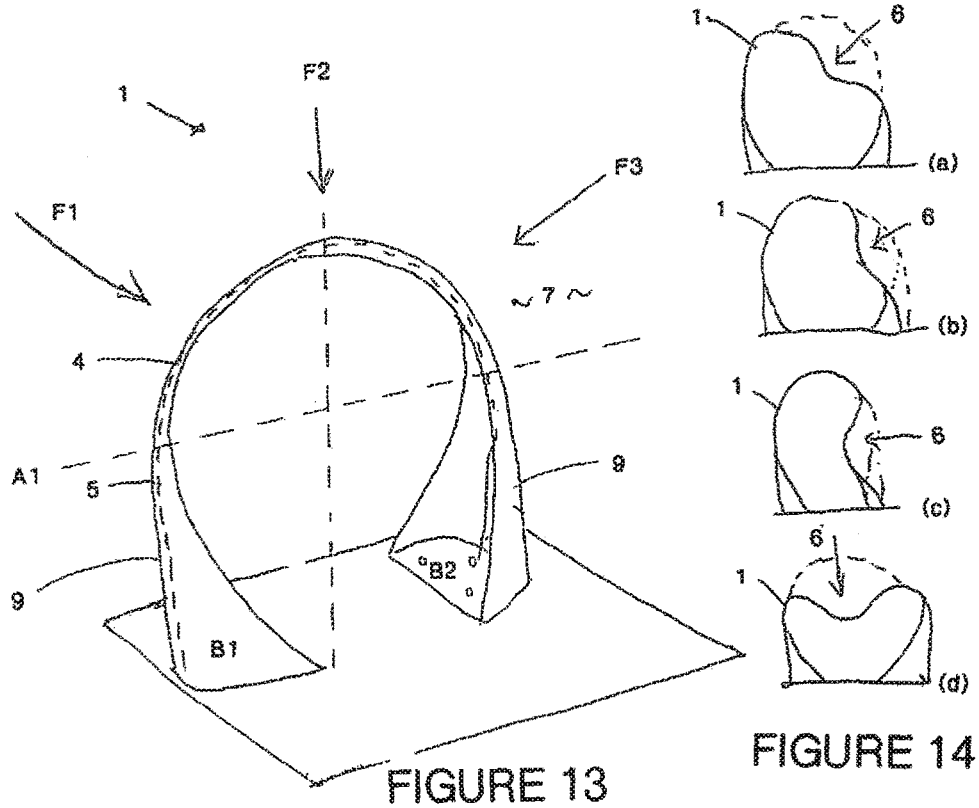
FIGURE 13
FIGURE 14
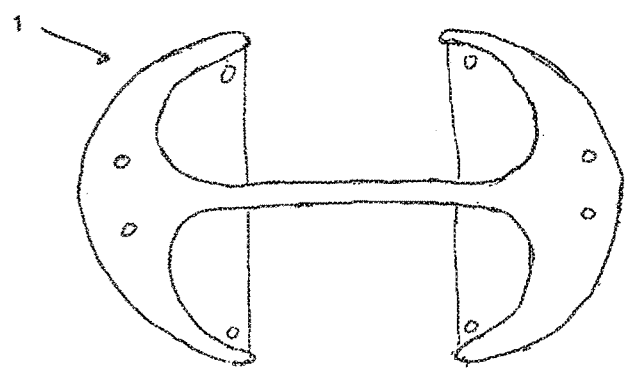
FIGURE 15

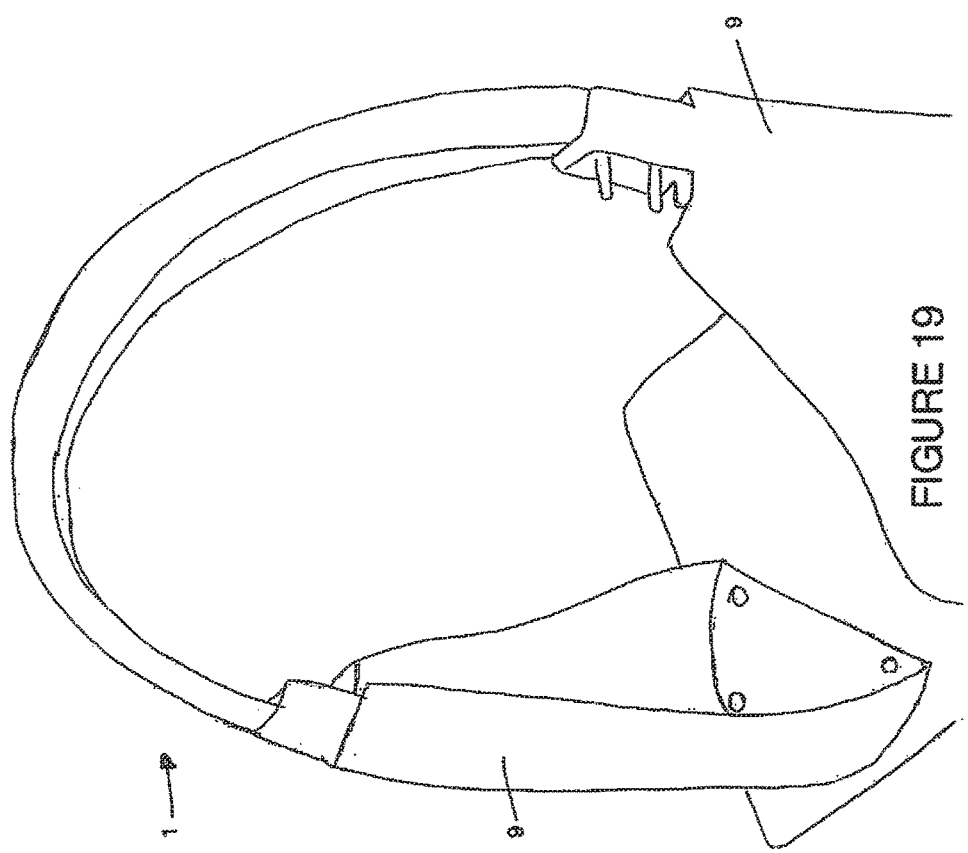

FLEXIBLE IMPACT PROTECTION

TECHNICAL FIELD OF THE INVENTION

The present invention relates to impact or crush protection.

In particular, though not solely, the present invention is directed to impact or crush protection for example, but not limited to, a user. Such impact protection may for example, but not limited to, be used for roll over protection of a vehicle or similar, for example a farm vehicle such as a quad bike.

BACKGROUND OF THE INVENTION

There are a number of solutions for impact and crush protection. For example, those used in roll over protection for vehicles; these can be broken loosely into two categories, rigid and active.

However, most roll over protection bars are rigid (even those that are active) and therefore could injure a rider or passenger of the vehicle if the roll over bar struck them while the vehicle is rolling, for example midroll or when they are on the ground. This is even more likely if the user or passenger is pinned between the roll over protection bar and the ground. The impact energy, or at least some of it, is transferred into the user. Thus while the user may be protected from the weight of the vehicle landing on them, some or all of that weight or kinetic energy may still be transferred to the user if they are struck or pinned by the roll over protection bar.

Rigid roll over protection bars are perhaps the oldest and most well known. They typically are a bar or hoop that extends from the vehicle and in the event of a roll over will prevent the vehicle impacting onto the user. In some situations these may also prevent the vehicle from rolling further. These come in either vertical or horizontal configurations.

Examples of such bars are shown for example in the patent family of EP2073998, NZ 575562, & AU2007294463 for a roll over protection system. These documents disclose a narrow elongate steel or similar material bar that extends upwardly from the rear of the vehicle, such as an all terrain vehicle.

The bar is rigid and is not designed to flex on impact. The geometry of such a narrow long shape bar ensures the vehicle cannot roll onto its back, or if it does, then it rolls onto its side again. However, the bar disclosed would injure a person if they were underneath it.

Also the bar disclosed would cause the vehicle to continue rolling onto its side and thus may injure the person.

A variation of rigid roll over bars is the deformable roll over protection bar. Examples of such a bar are shown in U.S. Pat. No. 5,890,738 for a rollover bar with deformable bearing. This document discloses a roll bar for a vehicle that is rigid and is mounted to a rigid part of the vehicle but has an elastically deformable part between it and the vehicle mount. This allows some movement of the roll bar (for example on impact of a user's head) to reduce injury before the roll bar is rigidly prevented from further movement. The bar disclosed would injure a person if they were underneath it.

Further examples are those shown in WO00/18678 and GB01341540 which are for a Industrial vehicle overhead guard and protective roof for a working vehicle respectively. These documents disclose an overhead protection roof for vehicles, such as a forklift, to guard the user from overhead falling debris. The roof is made of multiple elements, which are mounted off an overhead member. The elements are rigid to deflect debris falling from overhead but can move if the vehicle rolls over and the user is trapped between an object (for example the ground) and the roof elements.

Thus the user has a reduced chance of injury in a roll over situation where otherwise they would be pinned and injured by the roof.

Examples of active roll over protection systems are shown in US2009/0267335 for an ATV roll bar system. This document shows a rigid space frame that extends upward from a vehicle, such as an ATV. The space frame has a seatbelt or similar harness for the user, and has a mesh to provide a backrest for the user against the space frame.

The roll bar system may also have a tilt sensor that will set off an alert to the user of a near roll event and may also extend roll over stop bars.

However whilst active the roll bar is still rigid. The bar disclosed would injure a person if they were underneath it.

US2009/0278342 is for a vehicle roll bar apparatus with active material actuation. This document discloses a roll over bar that is stowed within the vehicle. When a roll over event is detected by sensors the roll over bar is deployed to at least protect the occupants from being crushed under the weight of the vehicle.

The user would be strapped into the vehicle and so is unlikely to be thrown clear under the roll bar. The roll bar is rigid. The bar disclosed would injure a person if they were underneath it.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

It is an object of the present invention to provide an improved impact protection system or to overcome the above shortcomings or address the above desiderata, or to at least provide the public with a useful choice.

BRIEF DESCRIPTION OF THE INVENTION

In a first aspect the present invention may be said to broadly consist in a flexible impact protection member adapted to be mounted to a first member to protect either or both said first member and a second member that impacts thereon, comprising or including, a plurality of mobile portions, said mobile portions being mounted end on end to each other, at least one tensile connection between adjacent said mobile portions to lock each of said plurality of mobile portions to each other to form said flexible impact protection member, wherein at least one portion of flexible impact protection member is adapted to be secured to said first member, and said flexible impact protection member at least in part extends away from said first member when said first member is in a normal operation mode or orientation, such that said flexible impact protection member can deflect from its normal shape due to an impact event thereon with said second member by said plurality of mobile portions moving relative to each other, such movement increasing tension in said tensile connection and therefore increasing stiffness of said flexible impact protection member.

Preferably at least some of said mobile portions, at least in part, move away from each other during said impact event to increase said tension.

Preferably said flexible impact protection member lies substantially in one major plane and said deflection is substantially in, or parallel to, said plane.

Preferably said major plane is oriented to receive said impact event substantially in or parallel to said plane.

Preferably said tensile connection is flexible at least parallel to said major plane.

Preferably said flexible impact protection member is in the form of a hoop or similar open shape.

Preferably said at least one portion for securing is an end of said flexible impact protection member.

Preferably said flexible impact protection member is secured at two said ends of a hoop shape.

Preferably said flexible impact protection member is oriented in an upward direction from said first member.

Preferably said first member is part of a vehicle and said flexible impact protection member acts as a flexible roll over protection.

Preferably said movement of said mobile portions relative to each other is in or parallel to said major plane.

Preferably said flexible impact protection member is substantially resilient against out of plane movement relative to its resilience to said movement in said major plane.

Preferably said flexible impact protection member is mounted by said at least one portion to said first member via at least one flexible connection.

Preferably said tensile connection can flex in said major plane, but not substantially out of said major plane.

Preferably said tensile connection is biased against movement in said major plane.

Preferably said plurality of mobile portions are discrete elements.

Alternatively said plurality of mobile portions are at least in part unitary with said tensile connection.

Preferably said mobile portions are rectangular prism elements in plan view whose major axis is transverse to said major plane.

Preferably each of said mobile portions abuts another of said mobile portions on adjacent facing major faces.

Preferably said mobile portions through thickness (parallel to said plane) decreases from a centre of said mobile portion to an outer edge.

Preferably said decrease in through-thickness is linear.

Alternatively said decrease in through-thickness is curved.

Preferably said tensile connection is in tension prior to any impact event.

Preferably said tensile connection is at least one flexible tensile member connecting adjacent several said plurality of mobile portions.

Preferably said tensile connection is at least one flexible tensile member connecting all of said plurality of mobile portions in series.

Preferably a contact point or line between two adjacent said mobile portions moves outwardly on said mobile portions in an impact event to cause said adjacent mobile portions to at least in part away from each other.

Preferably said tensile connection(s) is/are elongate strand like members.

Alternatively said tensile connection(s) is/are elongate belt like members.

Preferably said tensile connection(s) is/are located toward a centre of said mobile portions.

Alternatively said tensile connections are located at or towards and outside edge of said mobile portions.

Preferably there is a plurality of said flexible tensile members.

Preferably said at least one flexible tensile member are located internally of said mobile portions.

Preferably said tensile connection is comprised of a steel, composite, synthetic or the like material.

Preferably said tension in said tensile connection(s) can be adjusted.

Preferably said tensile connection includes a degree of elasticity to allow stretching of said tensile connection.

Preferably said degree of elasticity is provided by a biasing means in or on said tensile connection.

Preferably said biasing means is a spring at one end of said tensile connection.

Preferably said biasing means is at or toward one end portion of said flexible tensile member.

Preferably said flexible impact protection member is substantially self-resetting after an impact event and is therefore reusable.

Preferably said mobile portions are constructed from a resilient material, such as, but not limited to,
wood,
composite material,
plastics,
rubber,
metal (including aluminium and alloys), or
steel and steel alloys.

In another aspect the present invention may be said to broadly consist in a flexible impact protection member adapted to be mounted to a first member to protect both said first member and a second member that impacts thereon, comprising or including,
at least one flexible impact member,
at least one flexible end member resiliently secured to said flexible impact member, said at least one flexible end member for securing to said first member,
and said flexible impact protection member at least in part extends away from said first member when said first member is in a normal operation mode or orientation,
such that said flexible impact protection member can deflect from its normal shape due to an impact event thereon with said second member by at least deflection of said at least one flexible impact member.

In a further aspect the present invention consists in a method of providing impact protection, comprising or including the steps of,
providing a flexible impact protection member, said member comprising,
a plurality of mobile portions, said mobile portions being mounted end on end to each other,
at least one tensile connection to lock said plurality of mobile portions together to form a flexible impact protection member,
mounting at least one portion of said flexible impact protection member to a first member requiring protection from impact,
wherein when said flexible impact protection member suffers an impact event with a second member said flexible impact protection member can deflect at least in part about said second member by said plurality of mobile portions moving relative to each other, and at least in part away from each other, such movement increasing tension in said tensile connection and therefore increasing stiffness of said flexible impact protection member to therefore absorb energy of said impact event and reduce damage to both said first member and said second member.

Preferably said method includes the step of tensioning said tensile connection prior to said impact event.

Preferably said tensile connection is flexible.

In another aspect the present invention may be said to broadly consist in a vehicle with flexible impact protection, comprising or including, a plurality of mobile portions, said mobile portions being mounted end on end to each other, at least one tensile connection to lock said plurality of mobile portions together to form said flexible impact protection member, wherein at least one portion of flexible impact protection member is adapted to be secured to said vehicle, and said flexible impact protection member at least in part extends away from said vehicle when said vehicle is in a normal operation mode or orientation, such that said flexible impact protection member can deflect from its normal shape due to an impact event thereon by said plurality of mobile portions moving relative to each other, and at least in part away from each other, such movement increasing tension in said tensile connection and therefore increasing stiffness of said flexible impact protection member.

Preferably said tensile connection is in tension prior to said impact event.

Preferably said tensile connection is flexible.

In yet another aspect the present invention maybe said to consist in a kit of parts to provide a flexible impact protection member to protect from impact, both a first member, when mounted thereto and a second member when impacting thereon, said kit comprising or including, a plurality of mobile portions, said mobile portions being mounted or mountable end on end to each other, at least one tensile connection to lock said plurality of mobile portions together to form said flexible impact protection member.

Preferably said kit includes at least one mount and associated hardware to mount said flexible impact protection member to said first member.

Preferably said tensile connection is held or able to be held in tension prior to said impact.

Preferably said tensile connection is flexible.

In yet a further aspect the present invention maybe said to consist in a flexible roll-over impact protection as herein described with reference to any one or more of the accompanying drawings.

In yet a further aspect still the present invention maybe said to consist in a method of providing impact protection as herein described with reference to any one or more of the accompanying drawings.

In yet a further aspect the present invention maybe said to consist in a vehicle with flexible impact protection as herein described with reference to any one or more of the accompanying drawings.

In yet a further aspect the present invention maybe said to consist in a kit of parts as herein described with reference to any one or more of the accompanying drawings.

As used herein the term "and/or" means "and" or "or", or both.

As used herein "(s)" following a noun means the plural and/or singular forms of the noun.

The term "comprising" as used in this specification means "consisting at least in part of". When interpreting statements in this specification which include that term, the features, prefaced by that term in each statement, all need to be present, but other features can also be present. Related terms such as "comprise" and "comprised" are to be interpreted in the same manner.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7).

The entire disclosures of all applications, patents and publications, cited above and below, if any, are hereby incorporated by reference.

To those skilled in the art to which the invention relates, many changes in construction and widely differing embodiments and application of the invention will suggest themselves without departing from the scope of the invention as defined in the appended claims. The disclosures and the descriptions herein are purely illustrative and are not intended to be in any sense limiting.

Other aspects of the invention may become apparent from the following description which is given by way of example only and with reference to the accompanying drawings.

BRIEF DESCRIPTION OF THE DRAWINGS

Preferred forms of the present invention will now be described with reference to the accompanying drawings in which;

FIG. 3 shows at (A) a plan view of one of the mobile elements, (B) an isometric view of one of the shaped mobile elements in the second region, and (C) an isometric view of one of the mobile elements in the first region, FIG. 6 shows the relative movement of one mobile portion to its neighbour and the moving of the contact point away from the centre in an outward direction towards an edge, FIG. 13 shows a second embodiment of the present invention in isometric top front view, the base portions may be aligned on the front back line as shown, or may be angled towards either the front of the back, this may be done to vary the stiffness of the flexible impact protection member, FIG. 14(a) through (d) shows various forms of deflection of the flexible impact protection member from various directions and forces, FIG. 15 shows a plan view of the embodiment of FIG. 13, FIG. 19 shows a further isometric view of the embodiment shown in FIGS. 16(a) through (c).

DETAILED DESCRIPTION OF THE INVENTION

Preferred embodiments will now be described with reference to FIGS. 1 through 19.

As shown in FIGS. 5A and B the flexible protection member 1 is typically attached to a first member 2 which requires protection or is required to be protected from. A flexible impact protection member 1 then protects the first member 2 from impact or crushing with a second member 3, and or also protects the second member 3 from impact with the first member 2. In some situations the flexible impact protection member can be used as a roll over protection such as for example on a farm bike for example a quad bike. In other embodiments is may be used to protect corners of a stationary item from mobile ones or a mobile item from impact with other mobile or stationary items. In one form the present invention could find use as a bumper for a car or similar.

Figure 4:
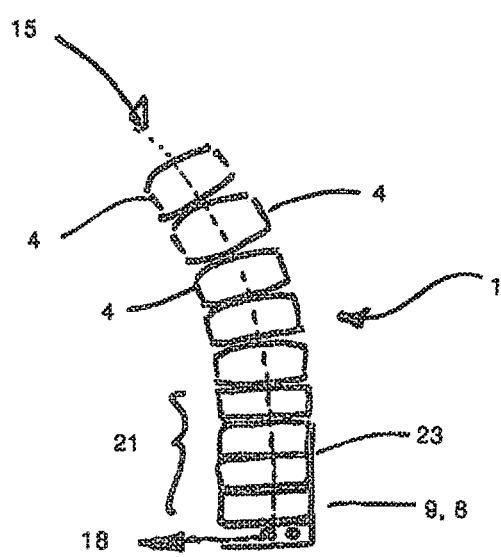
FIG. 4 shows in cross section the internals of one preferred form of the first embodiment, showing the end and portion for connection, first region and second region, and tensile connection between the mobile portions.
Figure 5:
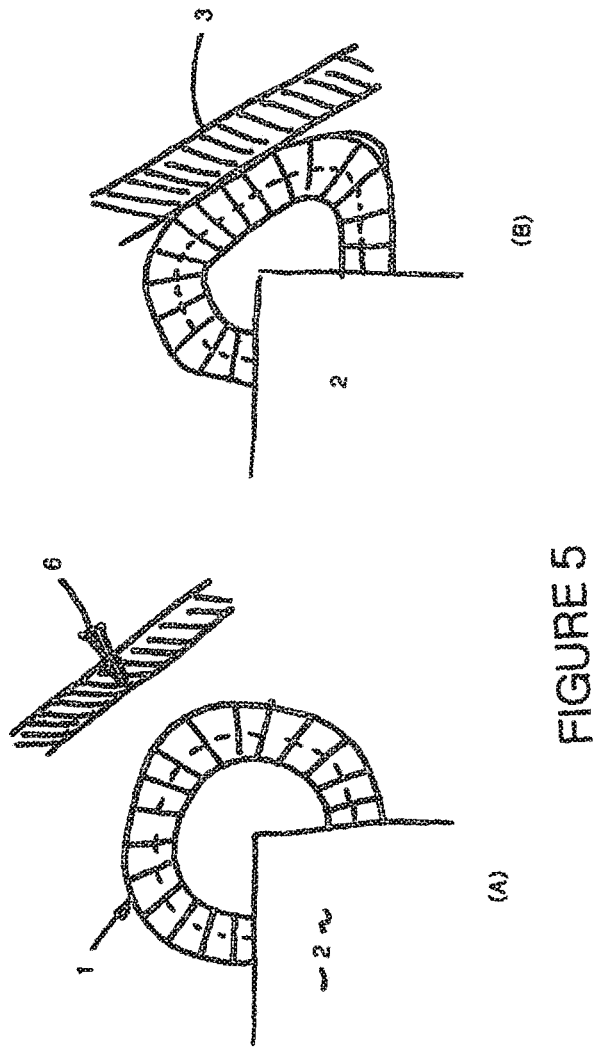
FIG. 5 shows (A) a flexible impact protection member applied to any form of first member (such as a bumper on a moving or stationary object), and (B) shows the flexible impact protection member of (A) deflected because of impact event with second member (such as a stationary or moving object)

A first embodiment of the invention is described with references to FIGS. 1 through 11 shown attached to a vehicle 11. The flexible impact protection member 1 comprises a number of mobile portions 4 shown in FIGS. 3 and 4. In the preferred embodiment these are joined end on end as shown to form a member 1. In the embodiment shown such as in FIG. 1 this is a hoop shaped arrangement with ends 9. However other arrangements may also be formed such as a straight member, or continuous as the situation requires. As can be seen the member 1 when in a hoop or closed form is largely flat and thus has a major plane 7 (the plane of the page in FIGS. 4, 5A and B). The member 1 is substantially rigid to movement out of this plane but is disposed to flex in response to an impact 6 in the line of parallel to the plane 7, as shown in FIG. 5. The member is therefore arranged when fixed to the first member 2 so as to receive the majority of expected impact events in the line of the major plane 7. The member may be attached to a base 28 or similar and then attached to the second member. Alternatively it may be directly attached.

The mobile portions 4 may be made from any resilient material such as, but not limited to, wood, composite material, plastics, metal, or steel, including aluminium and alloys of aluminium and steel.

For example when specified as roll over protection for a quad bike the member 1 in the form of a hoop is arranged so the major plane 7 is aligned transverse the bike, that is in the direction a roll over event as the impact event is likely to occur in.

At either end 9 of the hoop form is a portion 8 for connecting and securing the flexible impact protection member 1. This is shown in FIG. 4 and the connection is aided by bracket 23 extending from the first member to which the member 1 is secured to. Alternatively this bracket 23 may be part of the member 1. The member in this way is secured using known methods such as fasteners and the like. As shown in this Figure the ends 9 are straight up and down, but also could depart at an angle outwards or inwards of the first member 2.

The mobile portions 4 are shown in FIG. 3. In one preferred form the mobile portions 4 have a different cross section depending on where they are located in the member 1 and their functionality. The member 4a shown in FIG. 3A is curved top and bottom in side in its side cross section. The member 4b is substantially of constant cross section all the way through. Both mobile portions share a common arrangement to receive a tensile connection. In the preferred form the tensile connection is a flexible one provided by a flexible tensile member 15 (also shown in FIG. 1). Preferably there are two such members 15 running parallel to each other on the front to back line of the centre 14. The flexible tensile member 15, shown in FIG. 4 passes through an aperture 24 from end 9 to end 9, or all the way round if a closed shape. In preferred forms, depending on the size and strength required for the likely impact event there may be more than one flexible tensile member 15 or connector joining each mobile portion. For example there may be 2, 3, 4 or more such flexible tensile members 15 arranged through apertures 24 about the centre 14 of the mobile portion 4. Other forms of tensile connection may also be utilised such as individual mechanical connections, possibly elastic, between each mobile portion 4. In some forms there may be a hybrid of tensile connections.

The flexible tensile member 15 can be made from any one of a number of materials such as, but not limited to, steel rope, wire, composite materials such as Kevlar™, carbon and or spectra, Mylar™ or similar.

Figure 1:
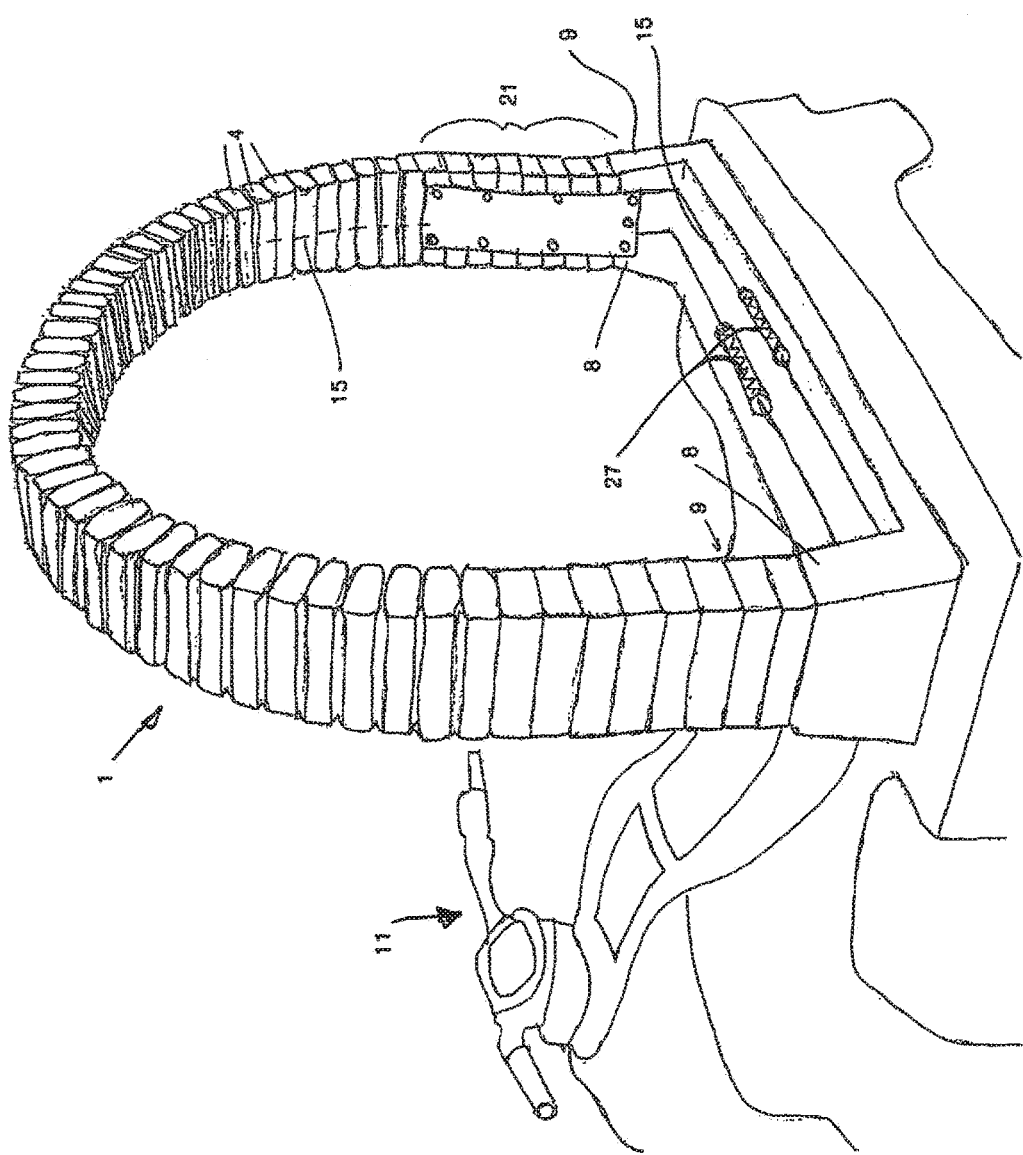
FIG. 1 shows in front top isometric view a first embodiment of the present invention.
Figure 2:
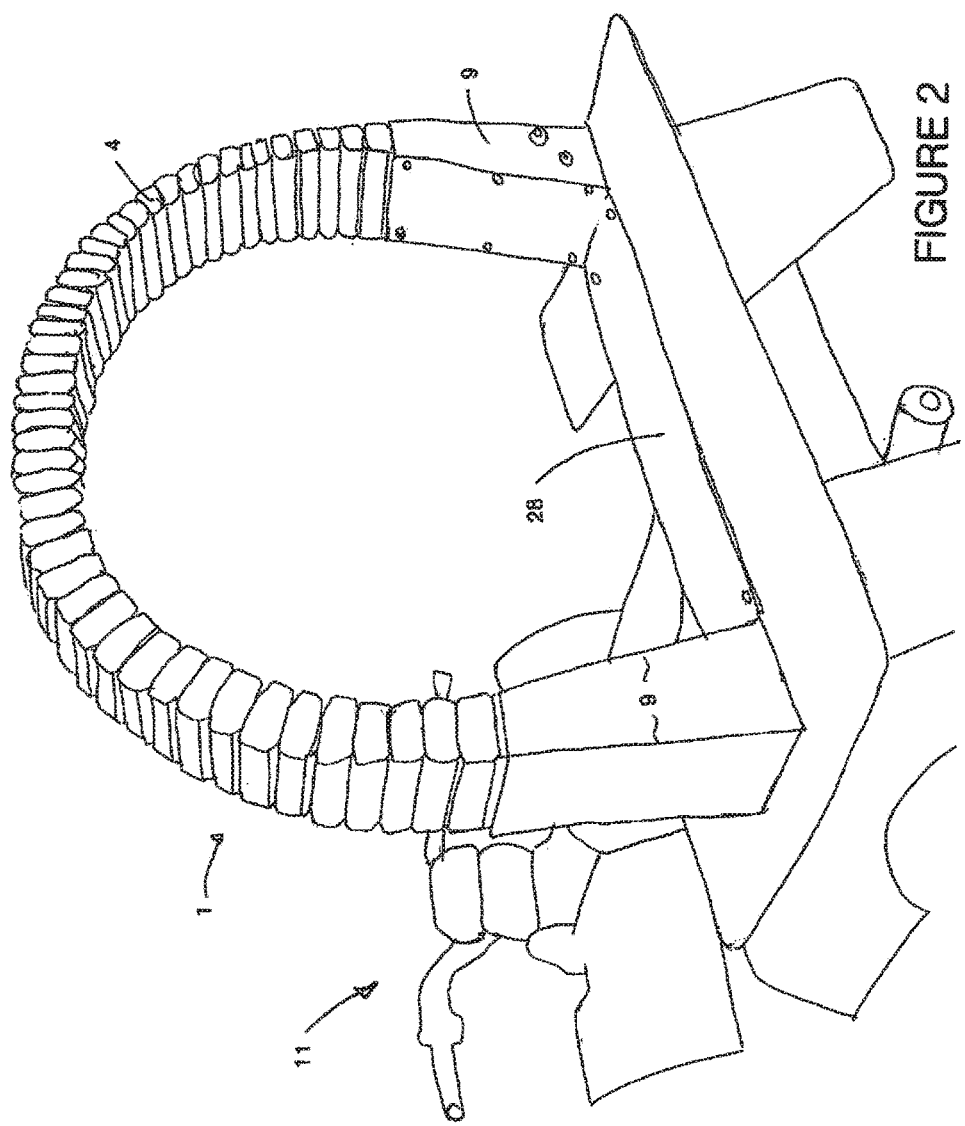
FIG. 2 shows in rear top isometric view a first embodiment of the present invention.

In the hoop embodiment of the member 1 shown in FIGS. 1 and 4, the flat mobile portions 4b form a first region 21 toward the connection ends 9. The curved mobile portions 4a form a second region 22 between the two ends 9. The first region is stiffer against an impact event than the second region 22. However it is still more flexible than a rigid structure. Such profiling can adjust the stiffness of the flexible impact protection member 1 as needed to control its deflection and transfer impact energies and deformation as desired. Variations in tension of the tensile connection 5 may be used also or in addition.

Figure 10:
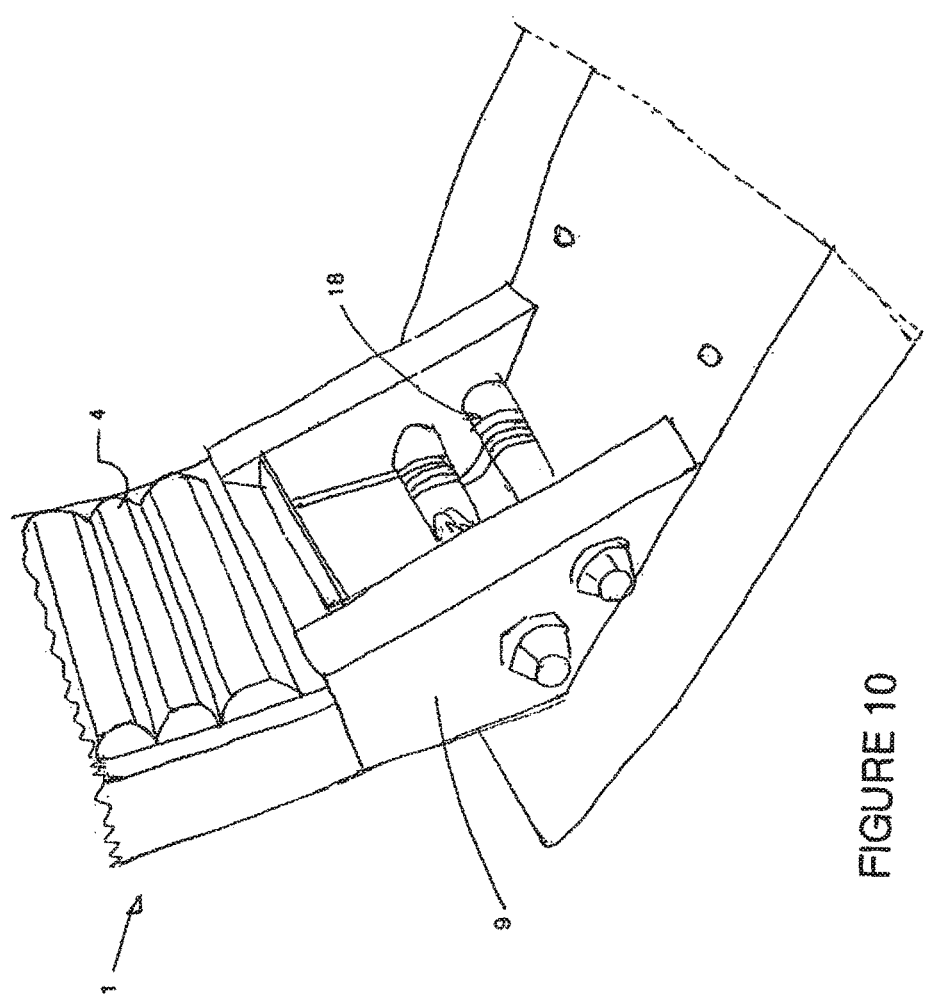
FIG. 10 shows the end portion of the flexible impact protection member in close up to show the tension adjustment.
Figure 11:
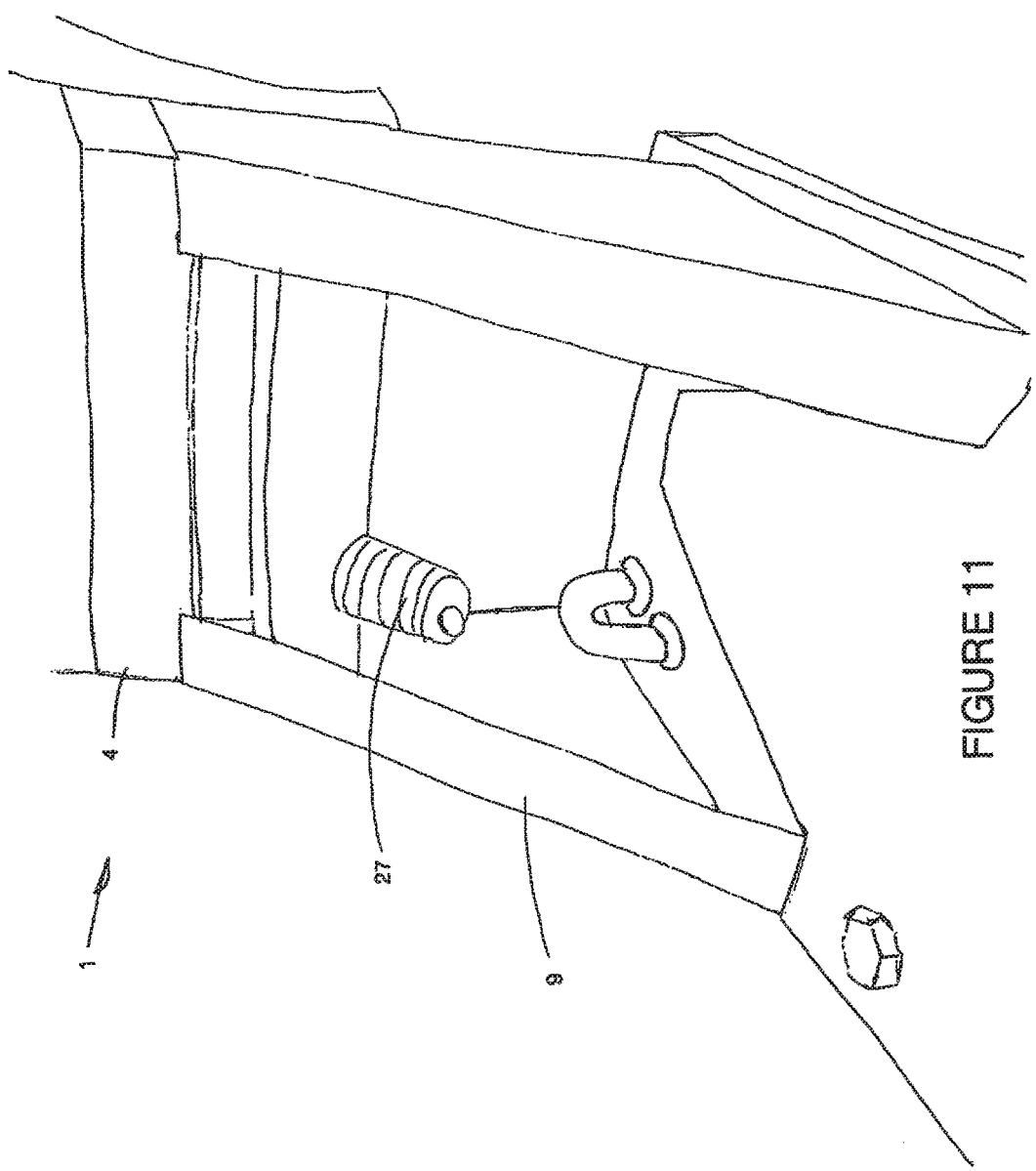
FIG. 11 shows the other end portion of the flexible impact protection member in close up to show a biasing means to provide some elasticity in the flexible connection.

Shown in FIGS. 10 and 11 are close up of the ends 9 of a hoop style arrangement of the member 1. At one end 9 shown in FIG. 10 the tensile connection as a flexible tensile member 15 has tension adjustment 18. This can take many forms and may be passive or active in response to an event. The embodiment here is a ratchet mechanism that a user can use to adjust the tension in the flexible tensile member 15. At the opposing end 9 shown in FIG. 11 there end of the tensile connection as a flexible tensile member has a biasing means 27 at its end. In other forms the biasing means 27 may be located as shown in FIG. 1. This serves to give the tensile connection further elasticity and take up and slack that may occur. The tension adjustment 18 may be at one or both ends as needed. As shown it is present at one end only. The tension adjustment 18 can be adjusted as necessary to provide the required tension in the member 1. Also over time as items wear or stretch this can be adjusted to account for their wear, and any slackening or increase or tension. In the embodiment shown the ratchet mechanism winds the flexible tensile member 15 onto a drum. A one way mechanism then prevents the drum unwinding under the tension, for example a friction device or ratchet.

There may also be a wear indicator what shows when the limit of adjustment has been reached and that some or all parts need replacing. For example the flexible tensile member 15 may stretch to a point there it will no longer take a load and then needs replacement. Similarly if one or more blocks wear too far then too much slack in member 15 taken up will indicate this. Also if the member 1 undergoes an impact event, there may be an indication the event is within safe boundaries to re-use the member, or the event was beyond safe criteria for continued operation.

The mechanism by which the member 1 absorbs an impact event will now be described with reference to FIG. 6. Under normal conditions, that is with no impact event, two adjacent mobile portions 4 sit with their contact line 16 approximately in the centre 14, or just slightly off in the case of a hoop or other curved arrangement. The tensile connection 15 is under tension in normal use, or is tensioned just prior to an impact event. When an impact event 6 occurs the mobile portions 4 move in response. Two adjacent portions as shown in FIG. 6B rock in relation to each other. Their profiled adjacent surfaces, shown with a curve in this embodiment facilitate this rocking. As they do the contact line 16 moves outward toward the edge of the portions 4 as shown in FIG. 6C. This non-linear profile gives the second region 22 a more flexible nature initially that then progressively becomes stiffer with deflection. The energy of the impact is arrested by this rocking of the mobile portions 4 which transfers the energy into the portions and tensions the tensile connection between members, for example flexible tensile member 15, further. The tension is further absorbed by the natural characteristics of the tensile connection, the mobile portions and the biasing means 27.

Figure 7B:
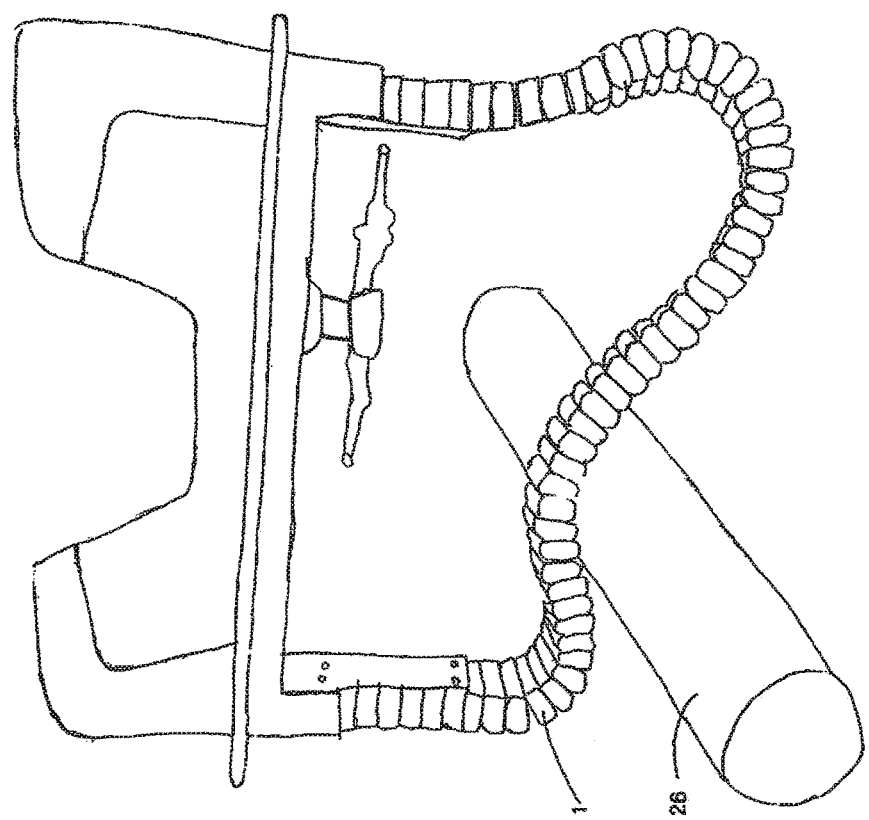
FIG. 7(A) shows the first embodiment attached to a first member (in this case for a vehicle) deflected around a user on impact with them in a roll over event, and (B) on impact with a second member (in this case a wooden pole) as an impact event.

As such the member 1 will absorb energy and arrest an impact event. If there is a fragile component as part of the impact, for example a user, this mechanism will also allow the member 1 to flex around the component or user and distribute the impact force and reduce the damage to the user or component. Such movement about the user 25 is shown in FIG. 7A where a vehicle 11 has rolled over onto the user 25 and on a component (in this case a wooden pole) in FIG. 7B.

The gradual increase in deflection resistance as stated will reduce impact damage but also decreases the likelihood of spring back from the member. This can prevent further damage to either member and the surrounding items. For example when used as a roll over protection member it can be important to stop the vehicle from rolling as soon as possible. This prevents further damage to the vehicle, and collateral damage to other items in the vicinity.

Figure 8:
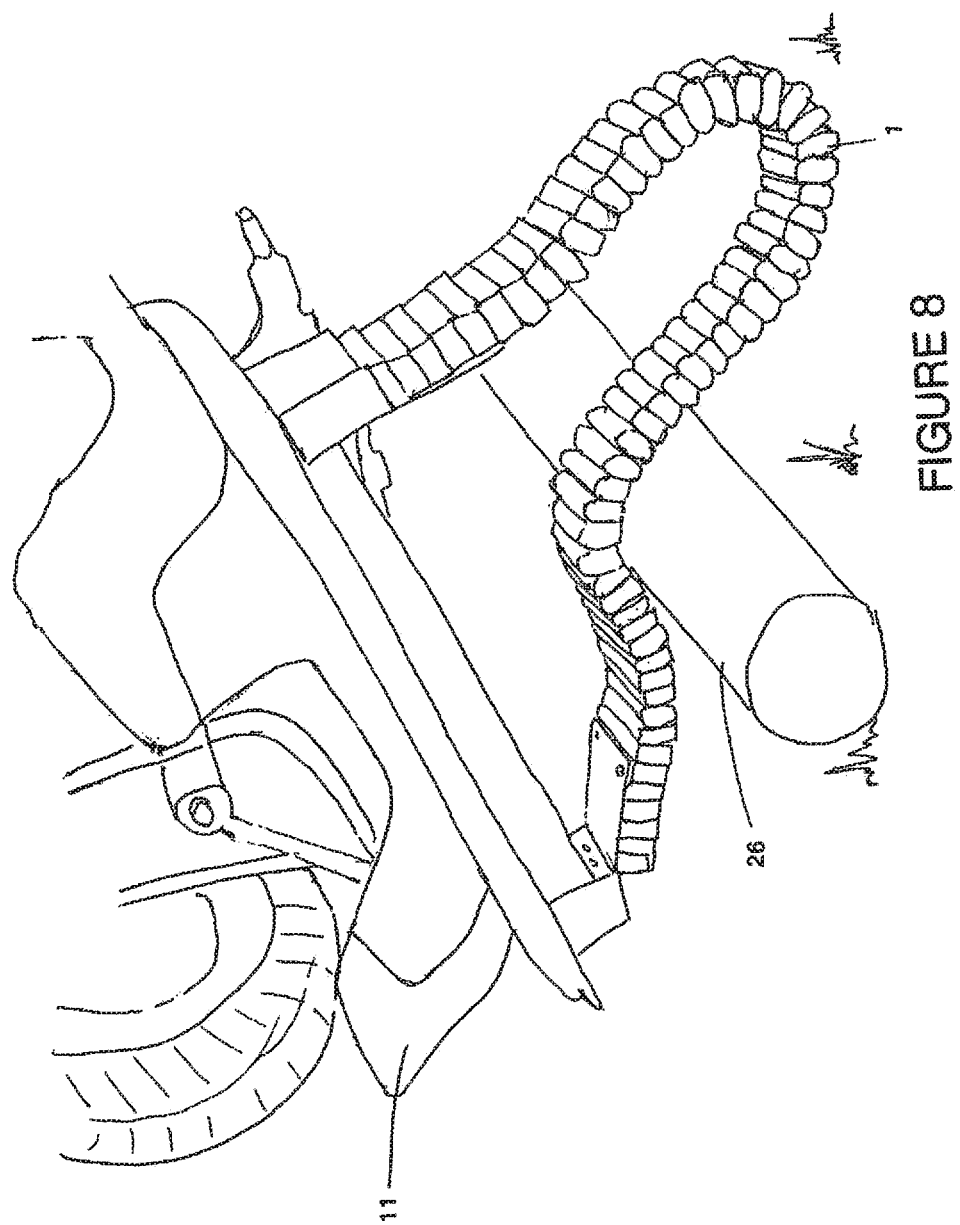
FIG. 8 shows the impact event of FIG. 7 with further deflection.
Figure 9:
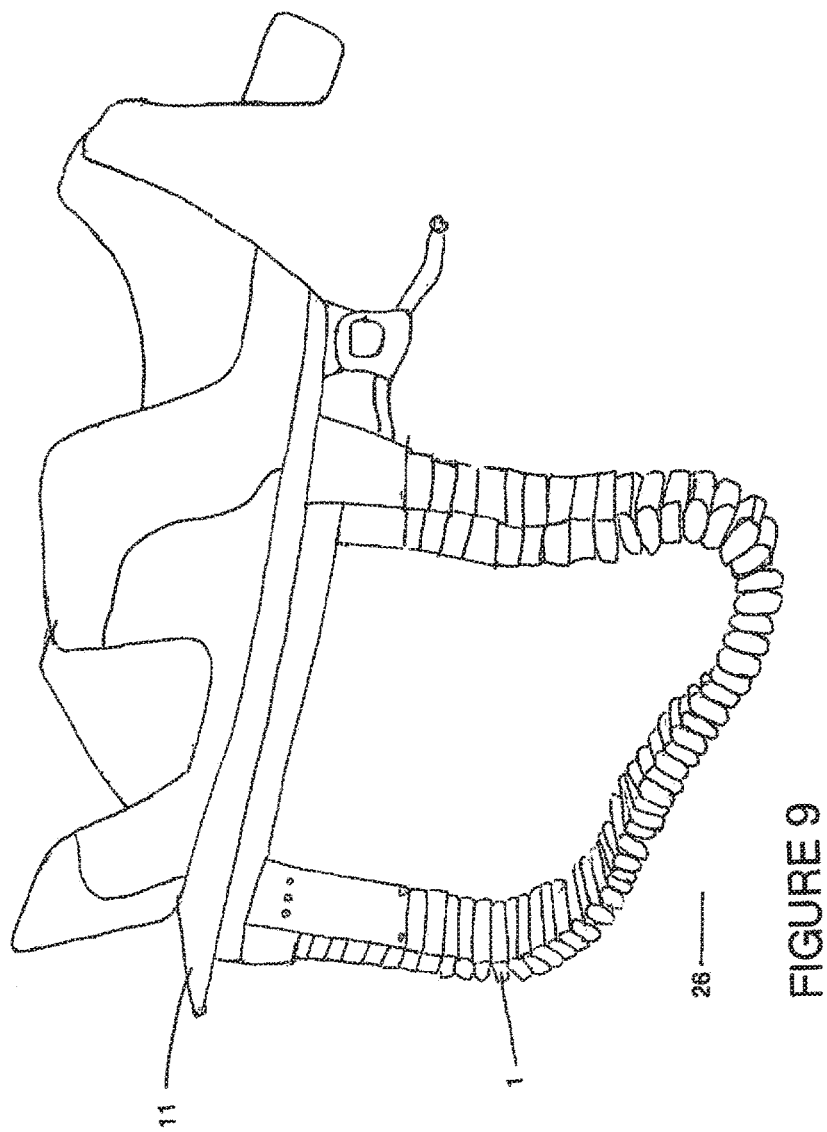
FIG. 9 shows an impact event where the second member is the ground.

FIG. 8 shows a further deflection that moves the member further in the direction of the roll this preventing further movement of the vehicle and therefore arresting the roll. Because the member 1 is flexible, when used as a roll over device it "squashes" as described above and also lowers the roll centre of the vehicle thus further arresting the roll. FIG. 9 shows a similar usage where the roll over event is onto ground and there is not component or user underneath.

Figure 12:
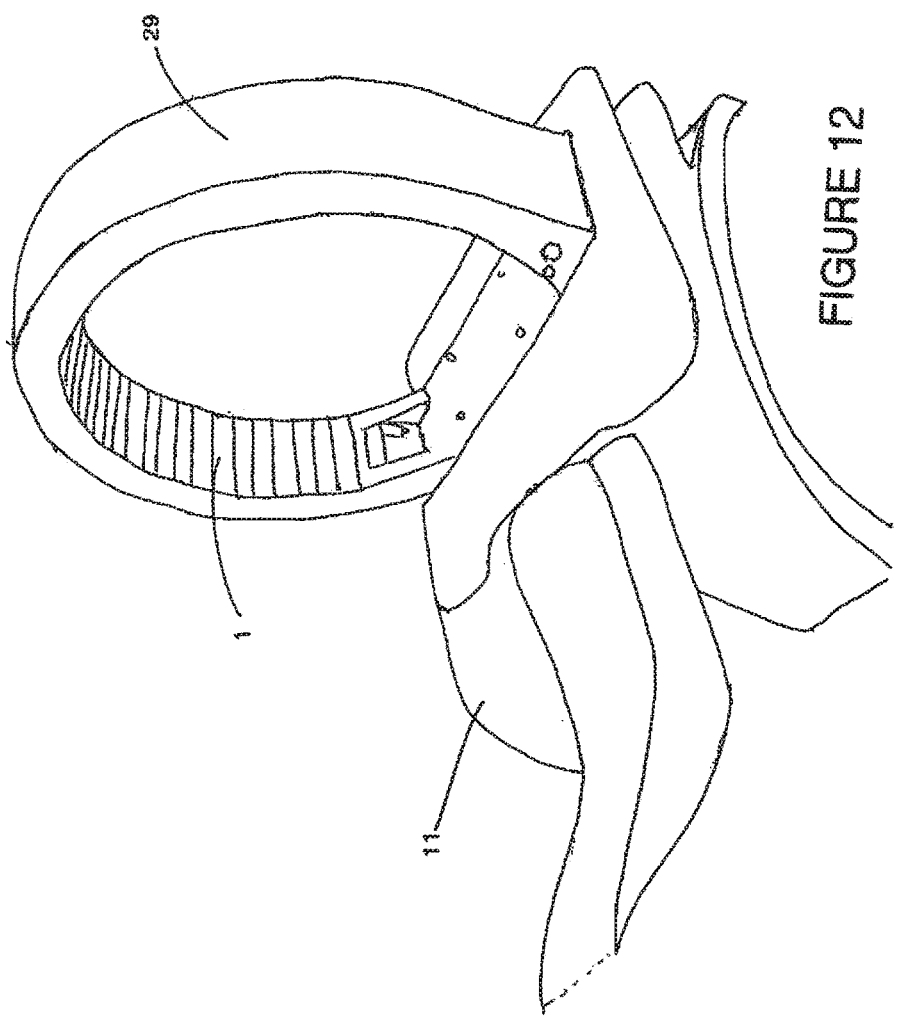
FIG. 12 shows a cover that may be used to protect the flexible impact protection member.

A cover 29 may also be present to protect the flexible roll over protection member from sunlight and dirt as shown in FIG. 12. The cover 29 may also be padded to provide additional protection when, for example the member 1 impacts a user.

A second embodiment will now be described with reference to FIGS. 13 through 16 and 19. The flexible impact protection member 1 shown utilises fewer mobile portions and may only use one 4. This may take the form of a hollow member 32 through which one or more tensile connections 5 pass. In the preferred form these are flexible tensile members as previously outlined. The mobile portion 4 and tensile connections then connect to ends 9 which can then be attached to the member requiring protection. Again the member 1 lies substantially in a major plane 7 and is more resilient to out of plane flex than in plane flex. Again the member would be aligned so as to receive the majority of impact events in the major plane. The ends 9 are braced as shown so as to increase stiffness to out of place movement 33. There may optionally be tensile connections in these regions also. Such movement 33 would tension that edge 34 which an impact event 6 would deflect the member 1 away from. The outside casing and ends of this embodiment may be made of a plastics material which protects the interior tensile connections.

Figure 16:
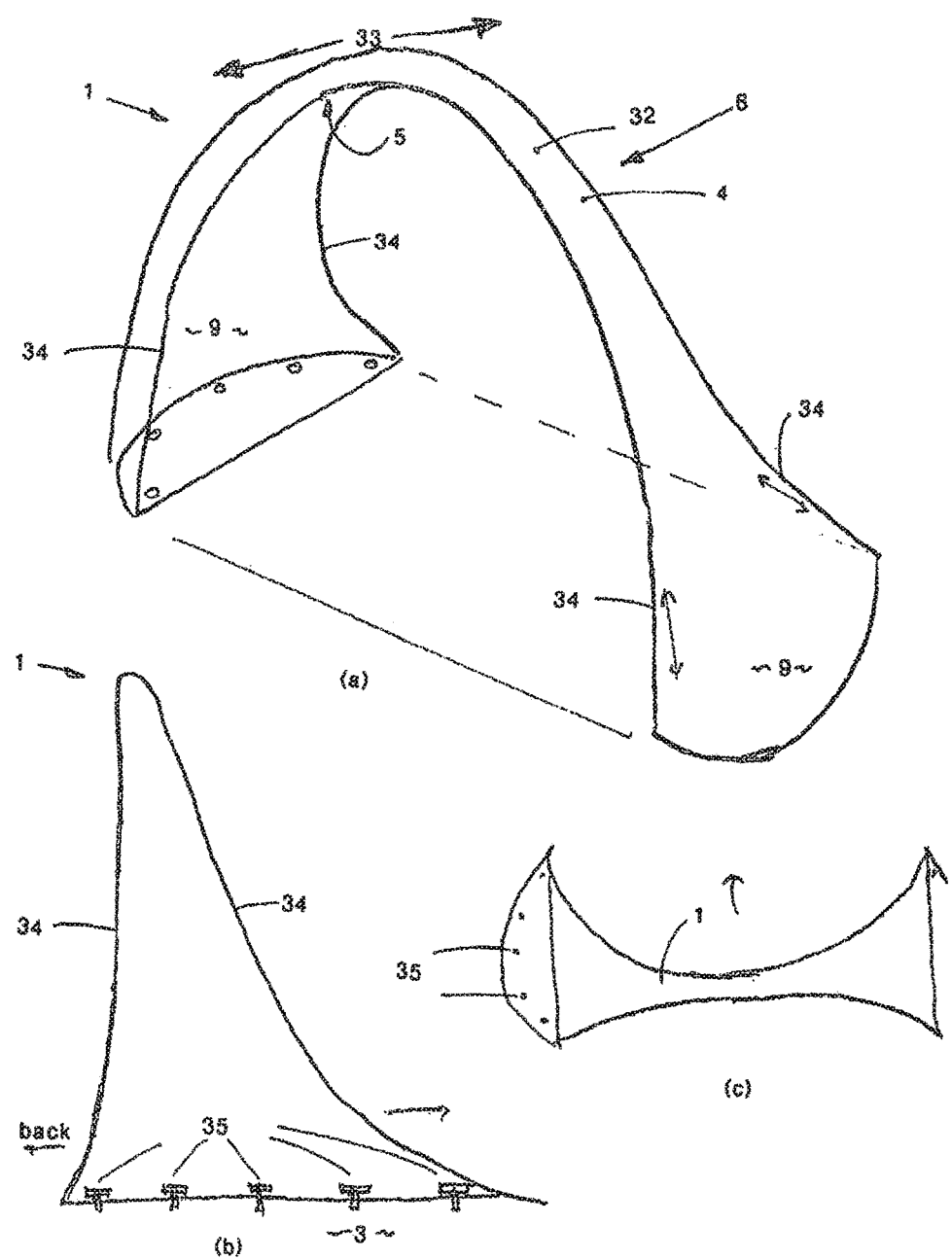
FIG. 16 shows at (a) a further isometric view of the second embodiment of FIG. 15, (b) a side view, and (c) a bottom part view.

The member 1 may be connected as shown for example in FIG. 16(*a*) by the end 9 with fasteners 35 or the like to the second member 3, such as for example a vehicle.

Various modes of deflection of both embodiments of member 1 to an impact event 6 are shown in FIG. 14. It can be seen the deflection leads to a general curved shape which is both strong and easier on anything impacted.

Figure 17:
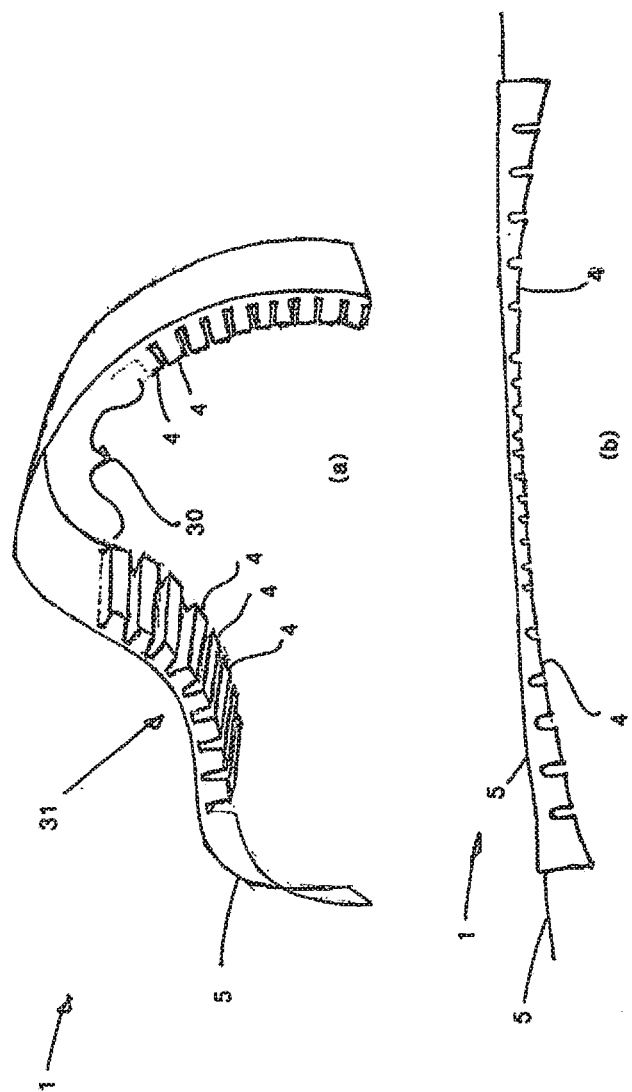
FIG. 17 shows a further embodiment of the present invention as (a) a partial isometric view whereby the or a tensile connection is on an outer periphery of the flexible protection member connecting or at least part of the mobile portions, and (b) a side elevation such as might come out from a mould or other manufacturing process prior to being curved into shape for fitting.
Figure 18:
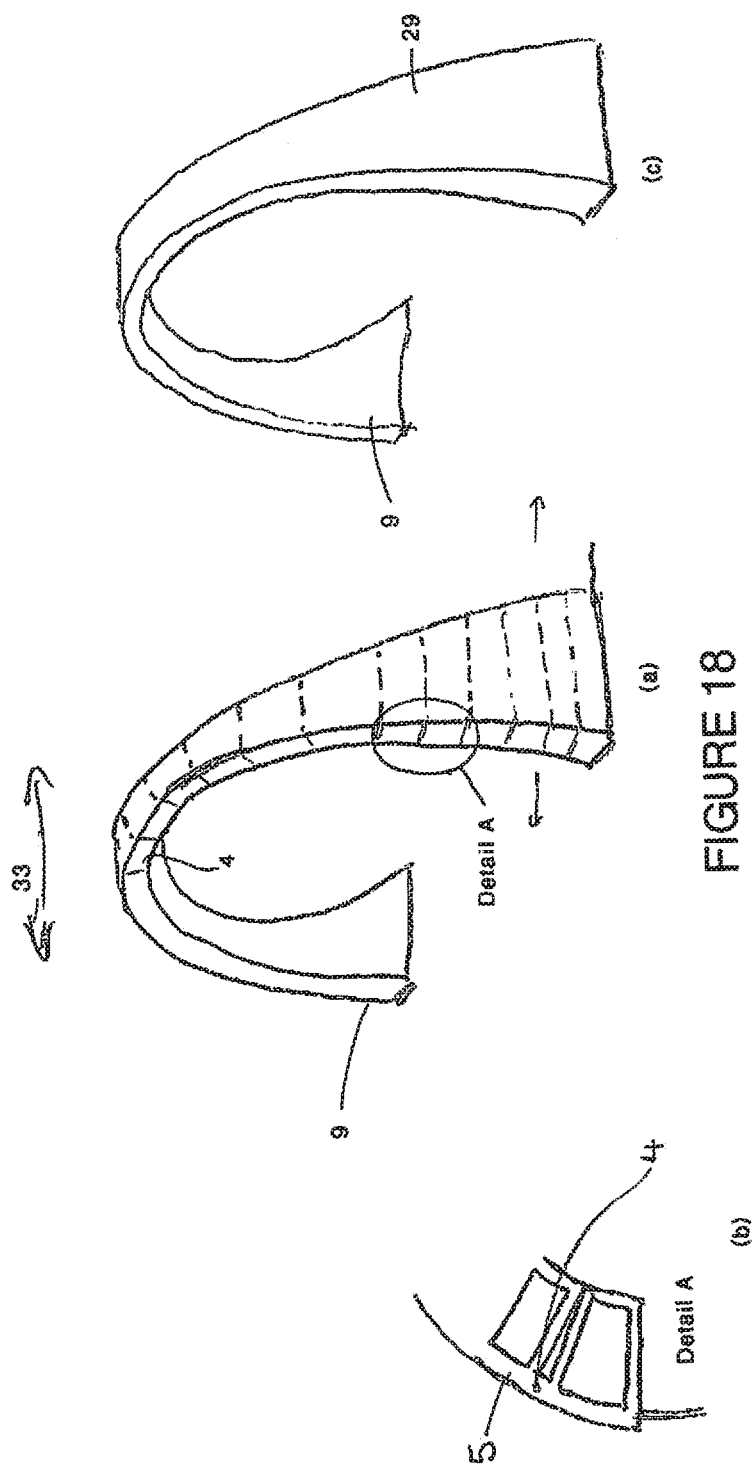
FIG. 18 shows the variation of FIG. 17 at (a) in side isometric form, (b) Detail A of FIG. 18(a), and (c) the variation with a cover attached.

A further embodiment of the flexible impact protection member 1 is shown in FIGS. 17(*a*) and (*b*) and FIGS. 18(*a*) through (*c*). In this embodiment the mobile portions are present (and extend in similar fashion as shown through portion 30). The tensile connection 5 is again flexible. It may comprise one or more strand like members or it could be a belt like member on the outer periphery, or a combination of both. Also rather than lying towards the centre of the mobile portions 4 it lies on the outer presenting edges of the mobile portions as shown. This embodiment will function in a similar way as described and could be considered as the inner half of the mobile portion embodiment with the tensile members running through the middle thereof. Again the mobile portions may be tapered or curved to increase tension on the tensile member 5. The form shown in FIG. 17(*a*) has under gone am impact event at or near portion 31. FIG. 18(*c*) has a cover in place.

The size of the mobile portions 4 may vary also to vary the properties, for example stiffness and deflection over the length of the member 1 as shown in FIG. 17(*b*).

This embodiment may be made as one piece or several pieces (for example mobile portions and tensile member). If made as one pieces it may be moulded in this way. If made of several pieces it may be mechanically connected together, or may be done as part of a co-moulding, insert moulding, over-moulding or similar.

The foregoing description of the invention includes preferred forms thereof. Modifications may be made thereto without departing from the scope of the invention.

The invention claimed is:

1. A flexible impact protection bar assembly configured to be mounted to a vehicle to protect an occupant of the vehicle during a rollover of the vehicle, comprising:
a plurality of mobile portions mounted end on end to each other, each of the plurality of mobile portions having an aperture formed there through;
a flexible tensile connection cord configured to pass through the apertures of adjacent ones of the plurality of mobile portions to furnish tensile force to hold the adjacent ones of the plurality of mobile portions against one another to form a flexible impact protection device,
at least a first end and a second end of the flexible impact protection device configured to fixedly secure the flexible impact protection device to the vehicle so that the flexible impact protection device extends away from the vehicle in a major plane during normal operation of the vehicle,
wherein the flexible impact protection device is rigid to movement in a direction outside of the major plane and can deflect in a direction within the major plane due to an impact event thereon, the plurality of mobile portions moving relative to each other during the impact event, such movement increasing tension in the flexible tensile connection cord for increasing stiffness of the flexible impact protection device.

2. The bar assembly of claim 1, wherein at least some of the plurality of mobile portions, at least in part, move away from each other during said impact event to increase said tension.

3. The bar assembly of claim 1, wherein the major plane is oriented to receive said impact event substantially in or parallel to said plane.

4. The bar assembly of claim 1, wherein the flexible impact protection device is in the shape of a hoop.

5. The bar assembly of claim 1, wherein the flexible impact protection device is secured at the first and second end of the flexible impact protection device in the shape of a hoop.

6. The bar assembly of claim 1, wherein the flexible impact protection device is oriented in an upward direction from the vehicle.

7. The bar assembly of claim 1, wherein the plurality of mobile portions are rectangular prism elements in plan view whose major axis is transverse to said major plane.

8. The bar assembly of claim 1, wherein the plurality of mobile portions through thickness parallel to said major plane decreases from a centre of said mobile portion to an outer edge.

9. The bar assembly of claim 1, wherein a contact point or line between two adjacent ones of the plurality of mobile portions moves outwardly on the plurality of mobile portions in an impact event to cause the adjacent ones of the plurality of mobile portions to at least in part move away from each other, further increasing stiffness of the flexible impact protection device.

10. The bar assembly of claim 1, wherein said flexible tensile connection cord is located internally of said plurality of mobile portions.

11. The bar assembly of claim 1, wherein the flexible tensile connection cord is comprised of a steel, composite, or synthetic material.

12. The bar assembly of claim 1, wherein the tension in said flexible tensile connection cord can be adjusted.

13. The bar assembly of claim 12, wherein the adjustment is provided by a biasing means in or on said flexible tensile connection cord.

14. The bar assembly of claim 1, wherein each of the plurality of mobile portions includes a curved surface.

15. The bar assembly of claim 14, wherein the curved surface is configured to facilitate the rocking of at least one of the plurality of mobile portions against the adjacent ones of the plurality of mobile portions.

16. A method of providing impact protection, comprising:
providing a flexible impact protection bar assembly configured to be mounted to a vehicle to protect an occupant of the vehicle during a rollover of the vehicle, the flexible impact protection bar assembly comprising:
a plurality of mobile portions mounted end on end to each other, each of the plurality of mobile portions having an aperture formed there through;
a flexible tensile connection cord configured to pass through the apertures of adjacent ones of the plurality of mobile portions to furnish tensile force to hold the adjacent ones of the plurality of mobile portions against one another to form a flexible impact protection device;
fixedly mounting at least a first end and a second end of the flexible impact protection device to the vehicle so that the flexible impact protection device extends away from the vehicle in a major plane during normal operation of the vehicle,
wherein when the flexible impact protection device suffers an impact event thereon, said flexible impact protection device is rigid to movement outside of the major plane and can deflect in a direction within the major plane by the plurality of mobile portions moving relative to each other, such movement increasing tension in the flexible tensile connection cord for increasing stiffness of the flexible impact protection device to absorb energy of the impact event and reduce damage to the vehicle.

17. The method of claim 16, wherein said method includes a step of tensioning said flexible tensile connection cord prior to said impact event.

18. A vehicle with a flexible impact protection bar assembly configured to protect an occupant of the vehicle during a rollover of the vehicle, comprising:
a plurality of mobile portions, mounted end on end to each other;
at least one flexible tensile connection cord to furnish tensile force to hold adjacent ones of the plurality of mobile portions against one another to form a flexible impact protection device,
at least a first end and a second end of the flexible impact protection device are configured to fixedly secure the flexible impact protection device to the vehicle so that the flexible impact protection device extends away from the vehicle in a major plane during normal operation of the vehicle,
wherein the flexible impact protection device is rigid to movement outside of the major plane and can deflect in a direction within the major plane due to an impact event thereon by the plurality of mobile portions moving relative to each other during the impact event, such movement increasing tension in the at least one flexible tensile connection cord for increasing stiffness of the flexible impact protection device.

19. The vehicle with a flexible impact protection bar assembly of claim 18, wherein each of the plurality of mobile portions includes an aperture formed there through, the flexible tensile connection cord configured to pass through the apertures of the adjacent ones of the mobile portions.

20. The vehicle with a flexible impact protection bar assembly of claim 18, wherein the flexible tensile connection cord is coupled to an outer presenting surface of the plurality of mobile portions.

* * * * *